B. P. CRANDALL.
Velocipede.
No. 92,273.  
Patented July 6, 1869.
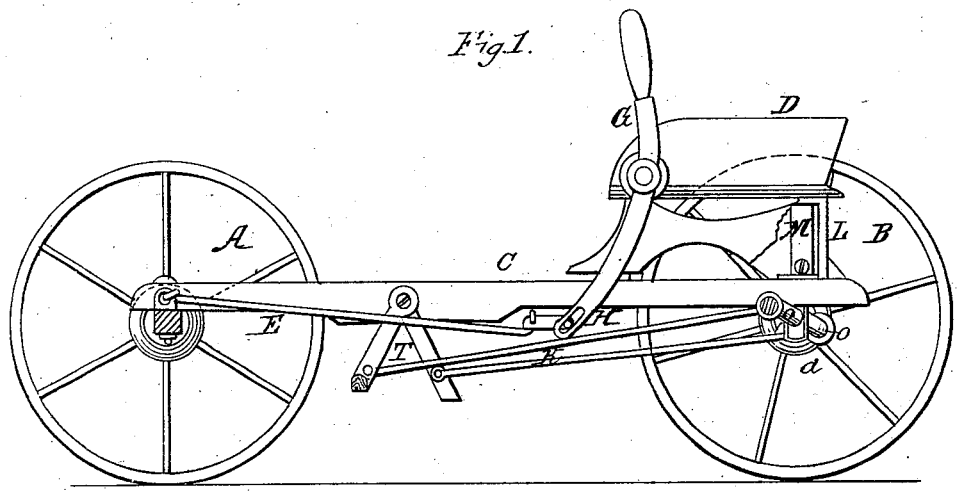
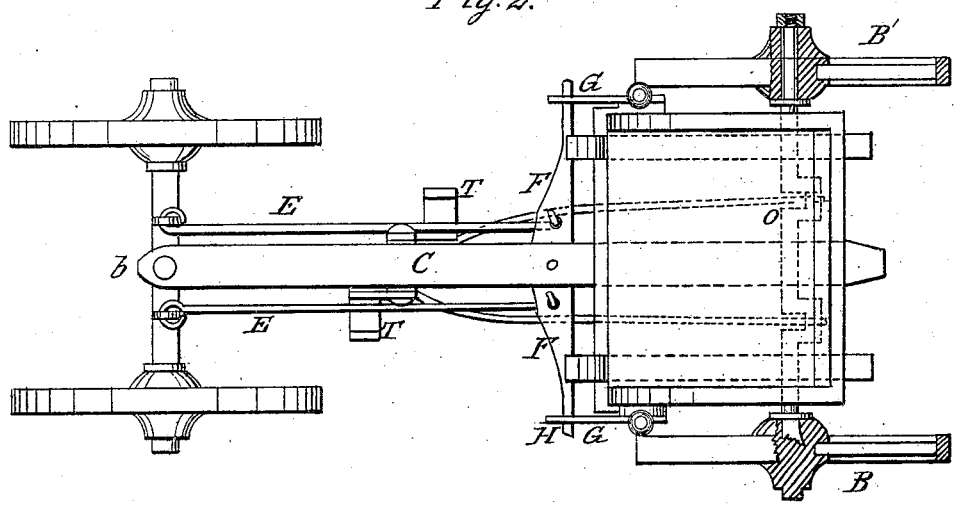
WITNESSES  
Phil. F. Larner  
Joshua Monroe
INVENTOR  
Benjamin P. Crandall

United States Patent Office.

BENJAMIN P. CRANDALL, OF NEW YORK, N. Y.

Letters Patent No. 92,273, dated July 6, 1869.

---

IMPROVEMENT IN VELOCIPEDES.

---

The Schedule referred to in these Letters Patent and making part of the same.

---

*To all whom it may concern:*

Be it known that I, BENJAMIN P. CRANDALL, of New York, in the county and State of New York, have invented a new and useful Improvement in Velocipedes; and I do hereby declare the following to be a full, clear, and exact description of the same, sufficient to enable others skilled in the art to which my invention appertains, to make and use the same, reference being had to the accompanying drawings, forming part of this specification, in which—

Figure 1 is a side elevation of the device, illustrating my invention.

Figure 2 is a top or plan view thereof.

Similar letters of reference indicate corresponding parts in the two figures.

My invention of certain new improvements in velocipedes consists—

First, in locating the steering-levers at the sides of the seats.

Second, in extending the reach to the crank-axle of the rear wheels, and adapting it as a central bearing therefor, in connection with the side-hangers or boxes, and a stiffening-brace.

Third, in mounting one of the wheels loosely on the crank-axle.

Fourth, in preventing vibrations of the steering-wheels reaching the hand-levers.

In the drawings—

A represents the fore, and

B B', the hind wheels, which are connected together by a reach, C.

The hind wheels are mounted on a double crank-axle, O, through the medium of suitable hangers or boxes *a*, suspended from, or secured to the frame which supports the seat D, or elsewhere, in any well-known manner.

In order to prevent any strain, twisting, or bending of the crank-axle, I provide an auxiliary bearing for it in the reach C, whereby there is a support or bearing on both sides of each crank of the axle.

In order to assist the operation of steering and turning, I mount one of the wheels B' loosely on the end of the crank-axle.

It is evident that in turning or changing the direction of any vehicle, one of the hind wheels has a tendency to rotate contrary to the other during said operation.

This is a natural result, and unless provision is made therefor, great resistance is offered.

In my invention, power is applied to the crank-axle O.

If both wheels were firmly secured to it, there would be great difficulty in steering or turning, owing to the power acting to move the wheels forward, while one of the wheels was resisting, as stated.

To overcome this, I mount one of the wheels, say, B', loosely on the axle, as stated.

The cranks, being on both sides of the centre, are operated uniformly, the power being equally distributed.

The wheels will keep to the front, and readily obey the steering-operation.

The front wheels guide and steer the vehicle.

Their axle is pivoted to the reach C, as seen at *b*; and to said axle are jointed arms E, which extend to the rear, and are in turn jointed to a cross-lever, F, whose bearings are on the reach C.

G represents hand-levers, which are journalled to the sides of the seat D.

They are slotted at their lower ends; and in these slots H project the ends of the cross-lever F, which ends should be sufficiently narrow or tapering to enter said slots to play therein.

Or the slots may be made in the cross-lever, and the lower ends of the levers G project into them.

It will be seen that the oscillations and the quiverings of the front wheels during motion, owing to their axle being pivoted, cause the ends of levers F to play in the slots H, and thus are not communicated to the hand-levers G, the hands of the rider, thereby, resting quietly thereon.

The steering-mechanism is within convenient reach, and is simple and practical in execution. The rider merely grasps the handles of levers G, and guides or steers as he or she intends.

T are foot-pedals or levers, suspended from the reach C, within convenient distance of the rider's feet.

Pitmen K connect said pedals and crank-axle O, whereby power is readily communicated to the latter.

A standard, L, rises from the reach C, and supports the rear of seat D.

This standard, in connection with the arched brace M, and the side frames, firmly sustains the seat.

Having thus described my invention,

What I claim as new, and desire to secure by Letters Patent, is—

1. The combination, with the steering-wheels, of the hand-lever G, arranged at the sides of the seat D, substantially as and for the purpose described.

2. The slot H, to allow vibration of the steering-wheels, without disturbing the hand-levers, substantially as set forth.

3. The combination, with a fixed wheel on the crank-axle, of a similar wheel, mounted loosely thereon, for the purpose described.

4. The reach C, forming an auxiliary bearing for the crank-axle, as set forth.

5. The standard L, rising from the reach, and supporting the rear of the seat, substantially as and for the purpose described.

6. The pedals T, suspended from the reach, and arranged in relation to the parallel rods E, as herein described.

7. The hand-levers G, at the sides of the seat, substantially as set forth.

To the above, I have signed my name, this 22d day of June, 1869.

BENJAMIN P. CRANDALL.

Witnesses:
 JOSHUA MONROE,
 PHIL. F. LARNER.